United States Patent
Huang

(10) Patent No.: US 9,497,810 B1
(45) Date of Patent: Nov. 15, 2016

(54) DIMMABLE SWITCHING MODE LED DRIVING CIRCUIT WITHOUT PHASE ANGLE MEASUREMENT

(71) Applicant: Alitek Technology Corp., Taipei (TW)

(72) Inventor: Wen-Hung Huang, Taipei (TW)

(73) Assignee: ALITEK TECHNOLOGY CORP., Taipei (TW)

(*) Notice: Subject to any disclaimer, the term of this patent is extended or adjusted under 35 U.S.C. 154(b) by 0 days.

(21) Appl. No.: 15/082,756

(22) Filed: Mar. 28, 2016

(51) Int. Cl.
*H05B 33/08* (2006.01)
*H02M 1/44* (2007.01)
*H02M 1/42* (2007.01)

(52) U.S. Cl.
CPC ........... *H05B 33/0815* (2013.01); *H02M 1/42* (2013.01); *H02M 1/44* (2013.01); *H05B 33/0845* (2013.01)

(58) Field of Classification Search
CPC .............. H05B 33/08; H05B 33/0815; H05B 33/0827; H05B 33/083; H05B 33/0848; H05B 33/0851; H05B 37/02; H02M 1/42; H02M 1/44
USPC .... 315/185 R, 200 R, 205, 209 R, 247, 291, 315/307, 308
See application file for complete search history.

(56) References Cited

U.S. PATENT DOCUMENTS

| | | | | |
|---|---|---|---|---|
| 8,242,766 B2* | 8/2012 | Gaknoki | ............ | H05B 33/0815 323/246 |
| 2013/0038227 A1* | 2/2013 | Yan | ..................... | H05B 33/0818 315/186 |
| 2013/0128640 A1* | 5/2013 | Lee | ......................... | H02M 7/12 363/126 |
| 2014/0097755 A1* | 4/2014 | Lee | ..................... | H05B 33/083 315/122 |

* cited by examiner

*Primary Examiner* — Thai Pham
(74) *Attorney, Agent, or Firm* — Guice Patents PLLC

(57) ABSTRACT

A dimmable switching mode LED driving circuit without phase angle measurement, including: a dimmer circuit for providing a phase-cut AC voltage; a bridge rectifier providing an input voltage by rectifying the phase-cut AC voltage; an electromagnetic interference filtering and energy storing circuit providing a line voltage according to the input voltage; a switching power converter converting the line voltage to an output current for an LED load under a control of a driving voltage; and a control unit using at least one feedback signal to perform a pulse width modulation operation to determine an on time for the switching voltage; wherein the control unit includes an on-time controller and a timer, the on-time controller determining the on time according to the at least one feedback signal, and the timer setting a maximum limit on the on time.

7 Claims, 8 Drawing Sheets

US 9,497,810 B1

DIMMABLE SWITCHING MODE LED DRIVING CIRCUIT WITHOUT PHASE ANGLE MEASUREMENT

BACKGROUND OF THE INVENTION

1. Field of the Invention

The present invention relates to a dimmable LED (light emitting diode) driving circuit, especially to a phase cut dimmable switching mode LED driving circuit without phase angle measurement.

2. Description of the Related Art

Conventional dimmable lighting circuits use a triac-based dimmer to perform a phase-cutting operation on a standard AC (alternating current) voltage source (60 Hz/110 Vin North America or 50 Hz/220 V in Europe) in response to a dimming operation, so as to control the input power and thereby control the lighting condition of a traditional lamp.

Due to a longer lifespan and a better electrical efficiency, LED lamps have been gradually replacing traditional lamps. In applications where a traditional lamp is replaced with an LED lamp, apart from maintaining a good power factor, the driving circuit for the LED lamp is generally required to provide a constant output current to ensure a stable lighting condition. To meet these requirements, a switching mode LED driving circuit is generally designed to have a PFC (power factor correction) function and a constant output current control mechanism. That is, the switching mode LED driving circuit for driving the LED lamp is generally designed to make an envelope of an input switching current in phase with an input voltage and in the meanwhile provide a constant output current to an LED lamp. However, when a dimmer circuit for providing a dimming function is placed between a standard AC voltage and the generally designed switching mode LED driving circuit, the operation of the dimmer circuit can be ineffective in dimming the LED lamp. The reason is that when a phase-cut AC voltage is applied to the generally designed switching mode LED driving circuit for adjusting the lighting condition, as the output current will remain unchanged, the lighting condition will also remain unchanged, and the dimming function will not be achievable. Besides, as the phase-cut AC voltage has a less conduction time than a standard AC voltage, to make a same constant output current, the peaks of the input switching current caused by the phase-cut AC voltage will be higher than the peaks of the input switching current caused by the standard AC voltage, and the higher peaks of the input switching current can cause damage to the components of the driving circuit.

Please refer to FIG. 1a-1c, which illustrate the waveforms of the input switching current caused by three different phase-cut AC voltages in comparison with the waveform of the input switching current caused by a standard AC voltage under a constant on-time and constant output current control of a switching mode LED driving circuit of prior art. As is known in the art, the constant on-time control can result in a good power factor and a constant output current by utilizing a constant on-time generation mechanism, in which the on time per switching cycle has a same duration when in a stable state, and the length of the same duration is dependent on the level of an average of an amplified error signal, the amplified error signal being generated according to a difference between a reference voltage and the voltage of a sensed signal of the input switching current.

When under different operation conditions, the length of the same duration of the on time per switching cycle will be automatically adjusted to required values to maintain a constant output current. For example, when the AC voltage gets lower or the load increases, the length of the same duration of the on time per switching cycle will be prolonged, and when the AC voltage gets higher or the load decreases, the length of the same duration of the on time per switching cycle will be shortened. Besides, the constant on-time control also implies a variable-frequency operation, in which the off-time per switching cycle will be reduced to increase a duty cycle when an input voltage decreases, and prolonged to decrease a duty cycle when the input voltage increases. As shown in FIG. 1a-1c, due to the constant on-time control the envelope of an input switching current takes the form of different phase-cut sinusoidal waveforms in response to different phase-cut AC voltages so as to provide a good power factor, and the off-time is variable and its length is dependent on the level of an input voltage—the higher the input voltage is, the longer the off-time will be. Besides, different constant on times $T_{on2}$, $T_{on3}$, and $T_{on4}$ are generated in response to different phase-cut AC voltages compared with a constant on time $T_{on1}$ generated in response to a standard AC voltage so as to maintain a same constant output current, wherein $T_{on4} > T_{on3} > T_{on2} > T_{on1}$. However, with the level of the constant output current remains unchanged, the dimming function will not be achievable.

To solve the problem, some applications of prior art have managed to adjust a reference current level according to a phase angle of the conduction periods. Please refer to FIG. 2, which illustrates a circuit diagram of a dimmable switching mode LED driving circuit of prior art. As illustrated in FIG. 2, the dimmable switching mode LED driving circuit includes a controller 10, a triac-based dimmer 20, a bridge rectifier 30, a switching power converter 40, an LED load 50, a power switch 60, and a current sensing resistor 70. As illustrated in FIG. 2, the controller 10 includes a dimmer detector 11, a reference current adjusting unit 12, and a switching power converter current controller 13, so as to adjust a reference current level according to a phase angle of the conduction periods of an AC voltage $V_{AC}$, and thereby provide a dimming function.

However, as a TRIAC voltage ($V_{TRC}$) of the triac-based dimmer 20 tends to be noisy, the phase angle detection circuit of the dimmable switching mode LED driving circuit of FIG. 2 has to be carefully designed. Besides, using the phase angle as a variable in determining the reference current level will make the entire control circuit much more complex.

To solve the foregoing problem, a novel dimmable switching mode LED driving circuit is needed.

SUMMARY OF THE INVENTION

One objective of the present invention is to disclose a dimmable switching mode LED driving circuit, which is capable of automatically adjusting the level of an output current in response to a phase-cut AC voltage to provide a dimming function without measuring the phase angle of the conduction periods of the phase-cut AC voltage.

Another objective of the present invention is to disclose a dimmable switching mode LED driving circuit, which is capable of automatically adjusting the level of an output current in response to a phase-cut AC voltage to provide a dimming function by setting a maximum limit on the on time per switching cycle.

Another objective of the present invention is to disclose a dimmable switching mode LED driving circuit, which uses a simple and robust control mechanism to quickly adjust the level of an output current in response to a phase-cut AC voltage to provide a dimming function.

Still another objective of the present invention is to disclose a dimmable switching mode LED driving circuit, which provides a high power factor and a constant output current even when no phase cutting dimmer is connected thereto.

To attain the foregoing objectives, a dimmable switching mode LED driving circuit without phase angle measurement is proposed, including:

a dimmer circuit for performing a phase-cutting operation on an AC voltage to provide a phase-cut AC voltage in response to a dimming input;

a bridge rectifier for providing an input voltage by performing a rectifying operation on the phase-cut AC voltage;

an electromagnetic interference filtering and energy storing circuit, for providing a line voltage by performing a filtering and energy storing operation on the input voltage;

a switching power converter for converting the line voltage to an output current for an LED load under a control of a driving voltage; and a control unit for receiving and processing at least one feedback signal from the switching power converter to generate the driving voltage;

wherein the control unit includes an on-time controller and a timer, the on-time controller being used for operating in a constant on-time mode to determine an on time of the driving voltage according to the at least one feedback signal, and the timer being used for setting a maximum limit on the on time.

In one embodiment, the control unit further includes a driver for providing the driving voltage.

In one embodiment, the control unit further includes a feedback circuit for using the at least one feedback signal to perform a pulse-width modulation operation to generate a timing control signal and provide the timing control signal to the on-time controller.

In one embodiment, the phase-cutting operation is a leading edge phase-cutting operation or a trailing edge phase-cutting operation.

In one embodiment, the at least one feedback signal includes a voltage feedback signal and/or a current feedback signal.

In one embodiment, the on time is a function of the input voltage.

In one embodiment, the on time is a function of the at least one feedback signal.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

Figure 1A:
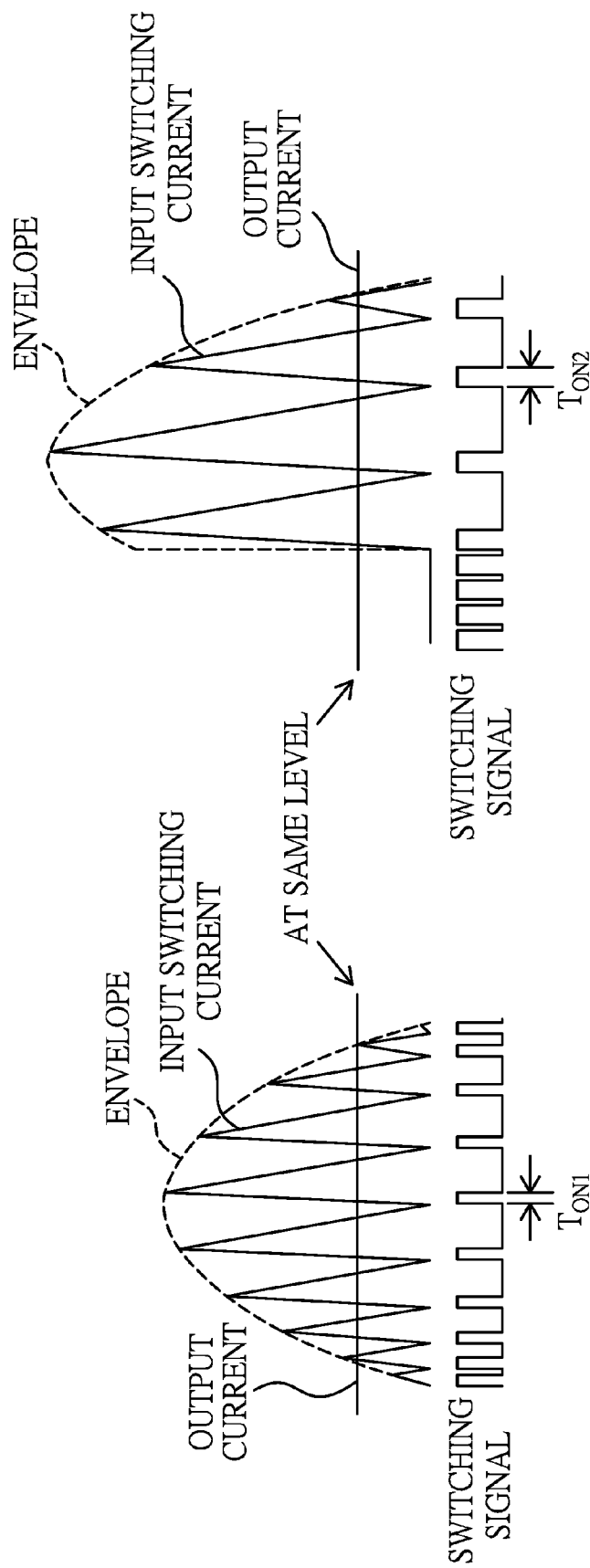
FIG. 1a-1c illustrate the waveforms of the input switching current caused by three different phase-cut AC voltages in comparison with the waveform of the input switching current caused by a standard AC voltage under a constant on time and constant output current control of a switching mode LED driving circuit of prior art.
Figure 1B:
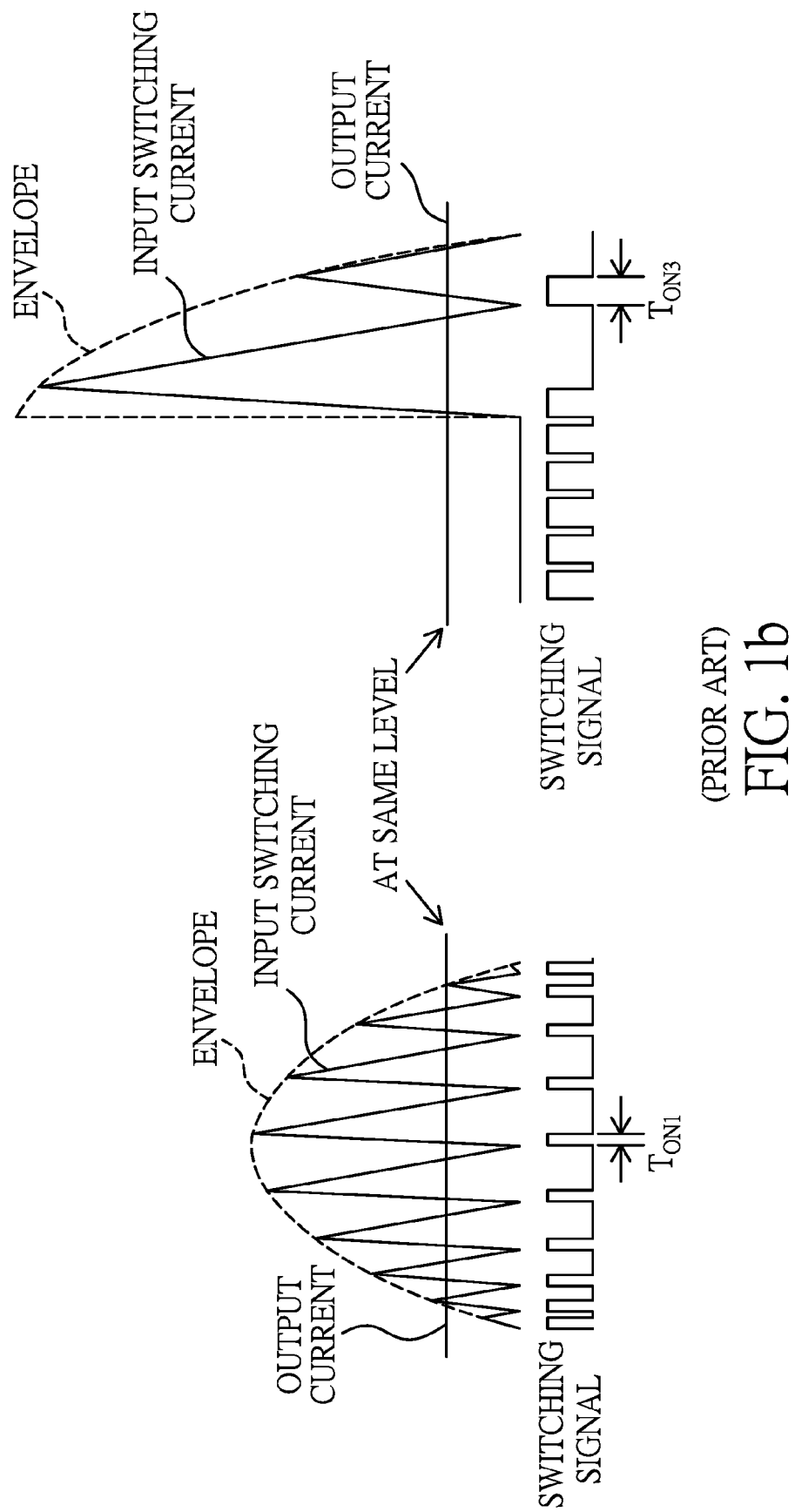
Figure 1C:
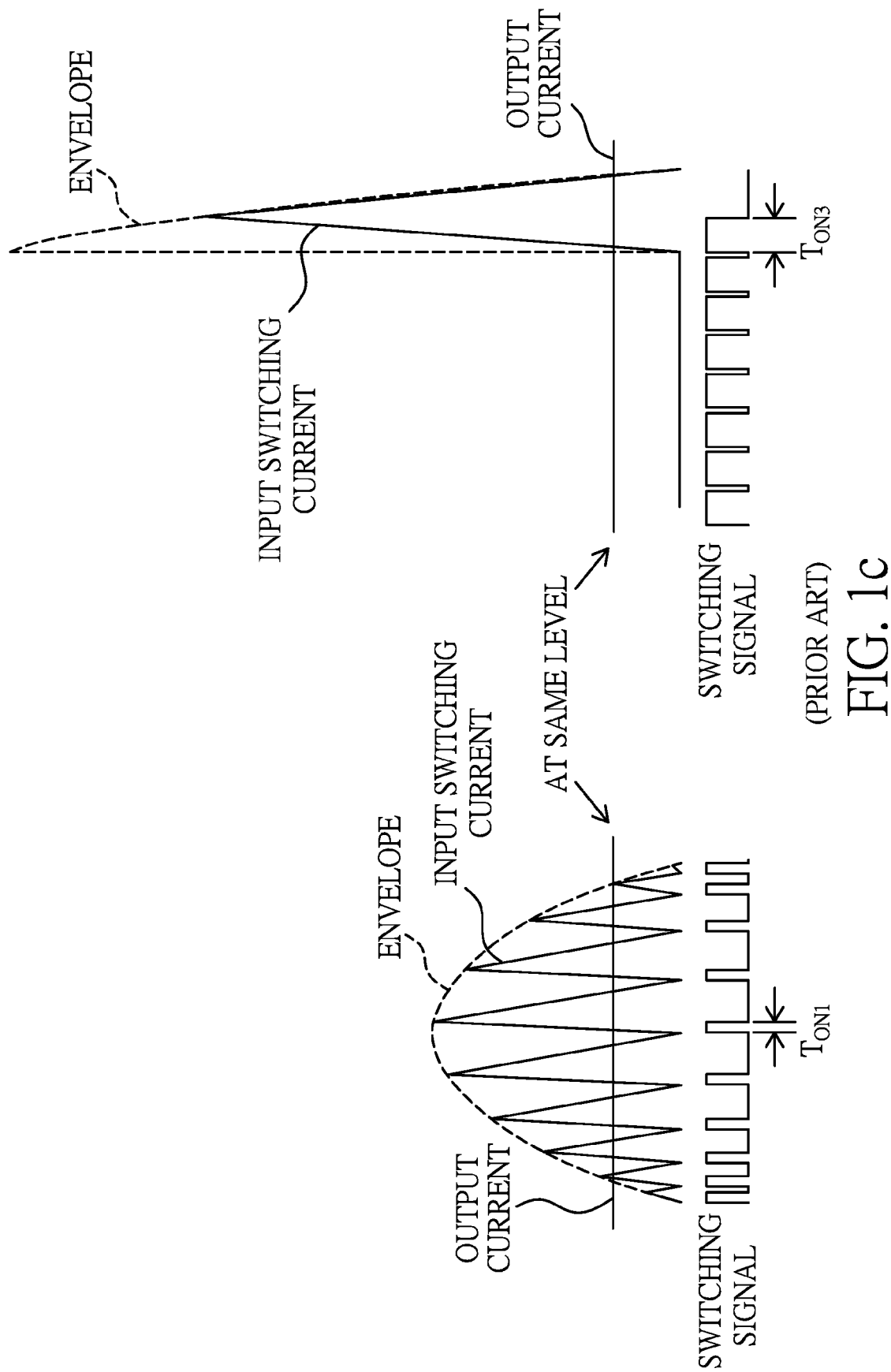
Figure 2:
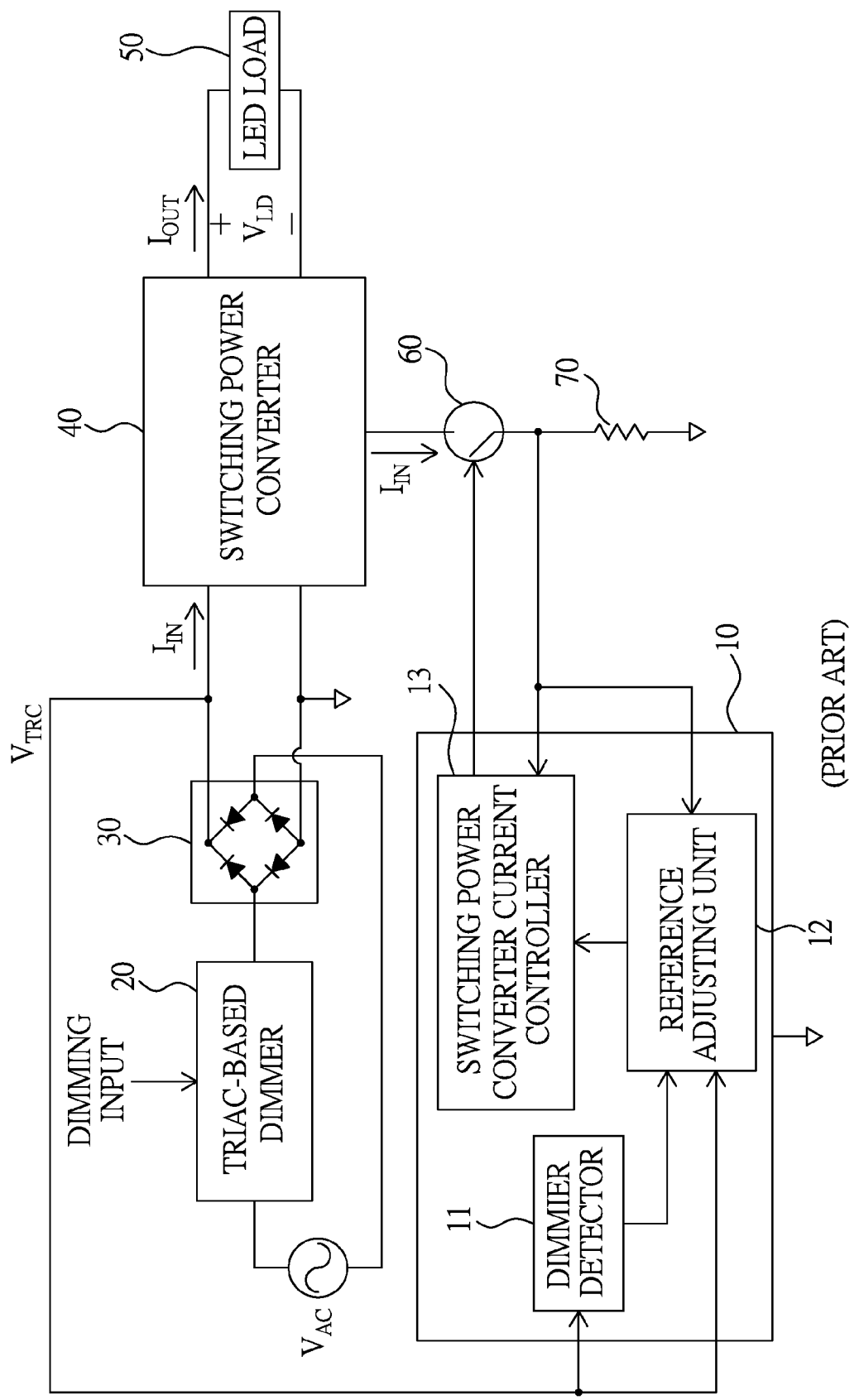
FIG. 2 illustrates a circuit diagram of a dimmable switching mode LED driving circuit of prior art.
Figure 3:
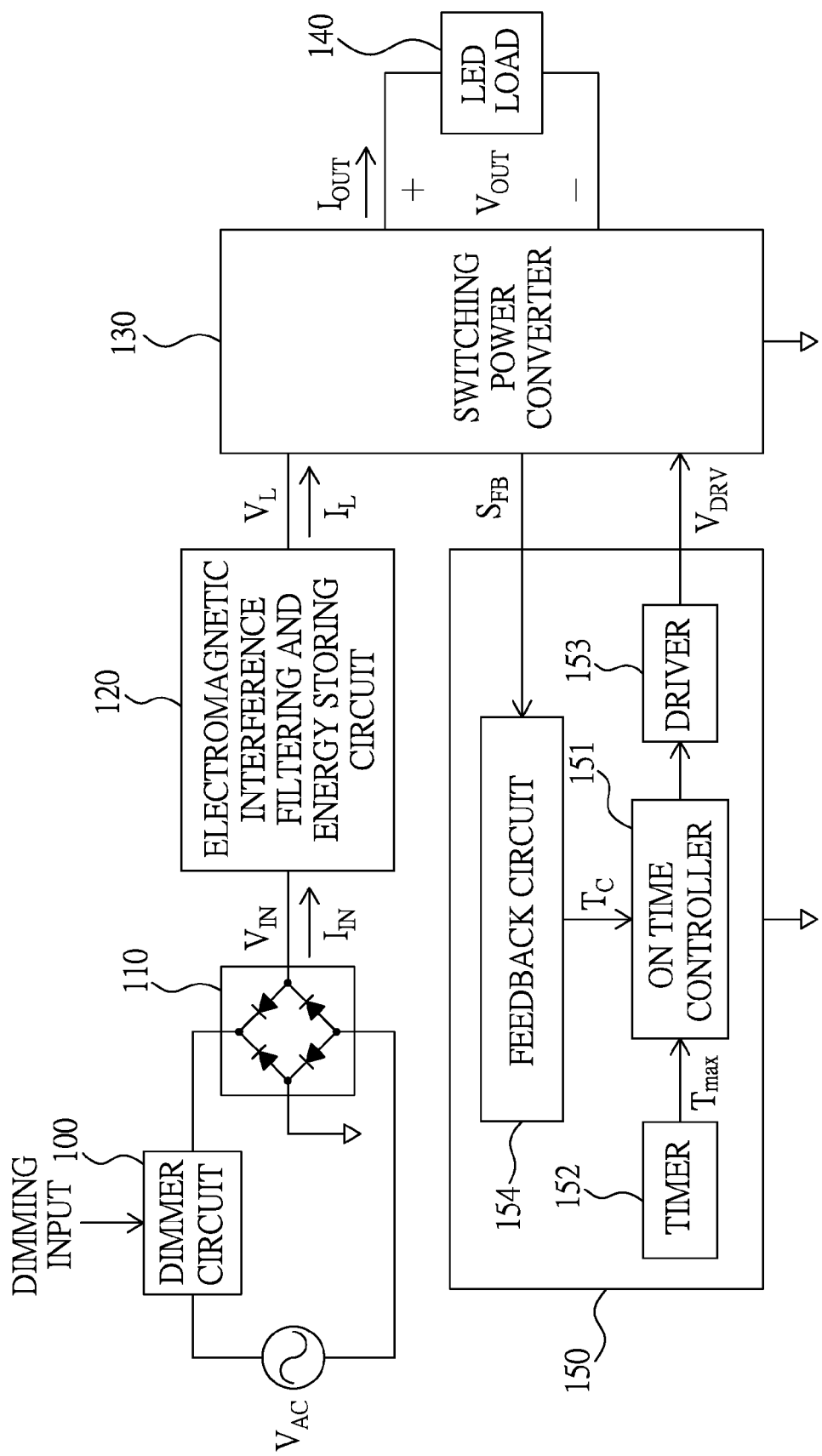
FIG. 3 illustrates a circuit diagram of a dimmable switching mode LED driving circuit according to an embodiment of the present invention.

Please refer to FIG. 3, which illustrates a circuit diagram of a dimmable switching mode LED driving circuit according to an embodiment of the present invention. As illustrated in FIG. 3, the dimmable switching mode LED driving circuit includes a dimmer circuit 100, a bridge rectifier 110, an electromagnetic interference filtering and energy storing circuit 120, a switching power converter 130, an LED load 140, and a controller 150, the controller 150 including an on time controller 151, a timer 152, a driver 153, and a feedback circuit 154.

The dimmer circuit 100 is used for performing a phase-cutting operation on an AC voltage $V_{AC}$ to provide a phase-cut AC voltage in response to a dimming input. The phase-cutting operation can be a leading edge phase-cutting operation or a trailing edge phase-cutting operation.

The bridge rectifier 110 is used for providing an input voltage $V_{IN}$ by performing a rectifying operation on the phase-cut AC voltage.

The electromagnetic interference filtering and energy storing circuit 120, including at least one inductor, is used for providing a line voltage $V_L$ by performing a filtering and energy storing operation on the input voltage $V_{IN}$. That is, apart from filtering out the noise caused by the dimmer circuit 100, the at least one inductor of the electromagnetic interference filtering and energy storing circuit 120 can also provide a holding current for a TRIAC in the dimmer circuit 100 to ensure a turned-on state of the TRIAC (As is known, when a TRIAC is turned on, it is necessary to have a minimum current flowing through the TRIAC to keep it turned on), and thereby provide a stable level of the line voltage $V_L$ to prevent an LED flicking.

The switching power converter 130 is used for converting the line voltage $V_L$ to an output current $I_{OUT}$ for the LED load 140 under a control of a driving voltage $V_{DRV}$.

The control unit 150 is used for receiving and processing at least one feedback signal $S_{FB}$ from the switching power converter 130 to determine the length of the on time and generating the driving voltage $V_{DRV}$ accordingly. The at least one feedback signal $S_{FB}$ can include a voltage feedback signal and/or a current feedback signal.

When in operation, the feedback circuit 154 will use the at least one feedback signal $S_{FB}$ to perform a pulse width modulation operation to determine the length of the on time and thereby provide a timing control signal $T_C$ to the on-time controller 151, which is capable of operating in a constant on-time mode. The constant on-time mode may use the at least one feedback signal $S_{FB}$ to modulate the on time duration or use the line voltage $V_L$ to modulate the on time duration for a better THD (total harmonic distortion) performance. The on-time controller 151 will determine a required duration of an on time of the driving voltage $V_{DRV}$ according to the timing control signal $T_C$ derived from the at least one feedback signal $S_{FB}$. The timer 152 will set a maximum limit on the on time, which can be equal to or within a predetermined range away from a reference on time set by a minimum of the input voltage, and the on-time controller 151 will determine a resultant duration of the on time by setting the resultant duration equal to the required duration when the required duration does not exceed the maximum limit, and setting the resultant duration equal to the maximum limit when the required duration exceeds the maximum limit. The driver 153 will provide the driving voltage $V_{DRV}$ according to the resultant duration of the on time to generate a corresponding level of the output current $I_{OUT}$. When the resultant duration is equal to the required duration, sufficient energy will be transferred to provide a first level of the output current $I_{OUT}$; and when the resultant duration is shorter than the required duration, the transferred energy will be insufficient for providing the first level of the output current $I_{OUT}$, and a lower level of the output current $I_{OUT}$ will be resulted. Therefore, according to the design of the present invention, when different phase-cut AC voltages are applied to the dimmable switching mode LED driving circuit of the present invention, different levels of the output current $I_{OUT}$ will be provided automatically, depending on the difference between the required duration and the resultant duration—the larger the difference is, the lower the level of the output current $I_{OUT}$ will be. That is, by setting a maximum limit on the on time, the present invention can automatically and quickly provide different levels of an output current in response to different phase-cut AC voltages without measuring the phase angle of the conduction periods of the phase-cut AC voltage, and thereby provide a dimming function.

Figure 4A:
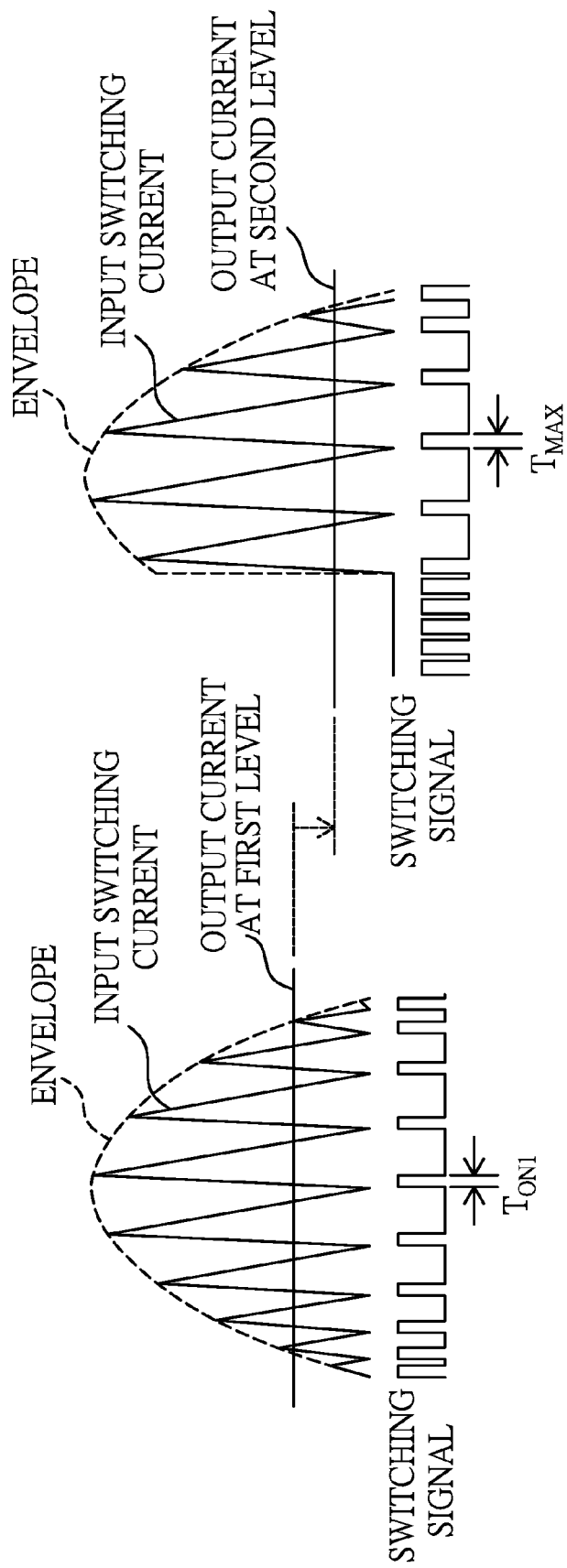
FIG. 4a-4c illustrate operation waveforms of the present invention.
Figure 4B:
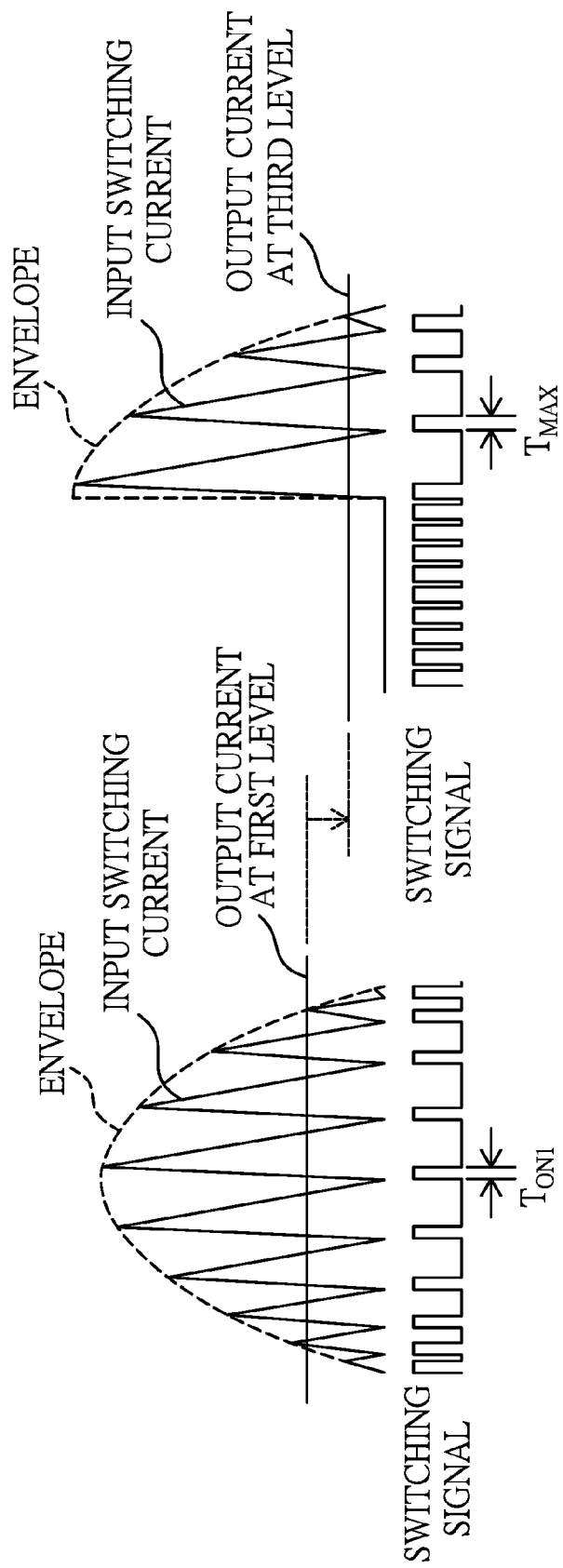
Figure 4C:
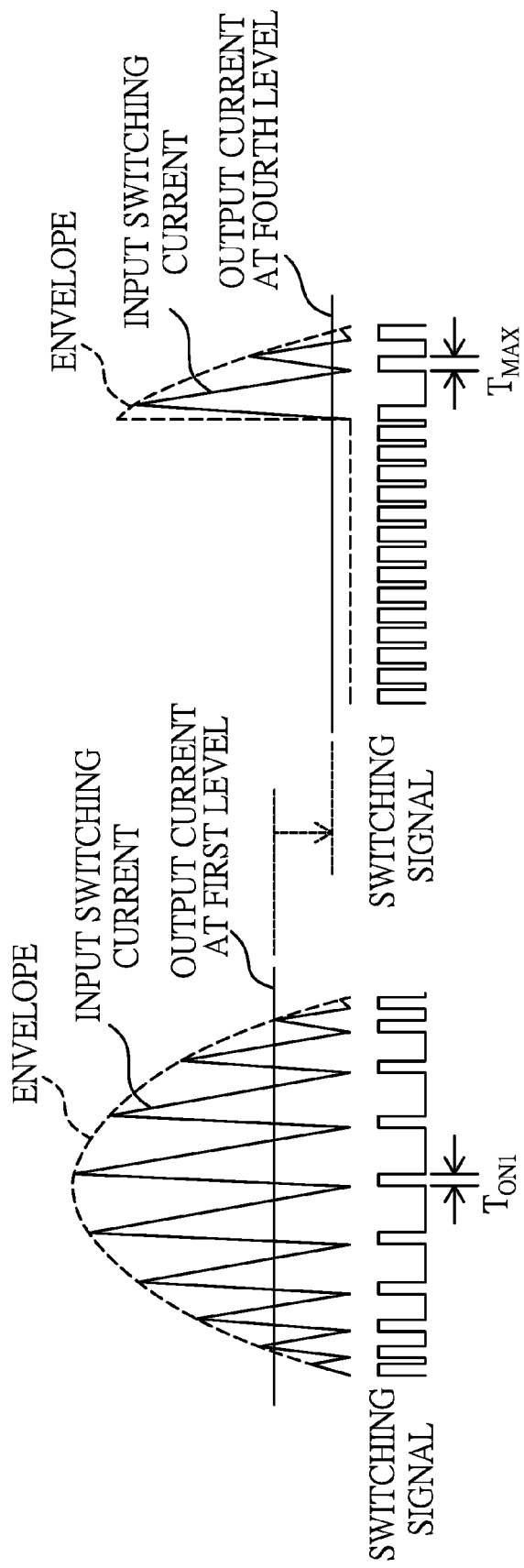

Please refer to FIG. 4a-4c, which illustrate operation waveforms of the present invention. As can be seen in the figures, the present invention can automatically provide different levels of an output current in response to different phase-cut AC voltages by setting a maximum limit $T_{MAX}$ on the on time.

Thanks to the designs disclosed above, the present invention offers the advantages as follows:

1. The dimmable switching mode LED driving circuit of the present invention can automatically adjust the level of an output current in response to a phase-cut AC voltage to provide a dimming function without measuring the phase angle of the conduction periods of the phase-cut AC voltage.

2. The dimmable switching mode LED driving circuit of the present invention can automatically adjusting the level of an output current in response to a phase-cut AC voltage to provide a dimming function by setting a maximum limit on the on time per switching cycle.

3. The dimmable switching mode LED driving circuit of the present invention can use a simple and robust control mechanism to quickly adjust the level of an output current in response to a phase-cut AC voltage to provide a dimming function.

4. The dimmable switching mode LED driving circuit of the present invention can provide a high power factor and a constant output current even when no phase cutting dimmer is connected thereto.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A dimmable switching mode LED driving circuit without phase angle measurement, including:
    a dimmer circuit for performing a phase-cutting operation on an AC voltage to provide a phase-cut AC voltage in response to a dimming input;
    a bridge rectifier for providing an input voltage by performing a rectifying operation on the phase-cut AC voltage;
    an electromagnetic interference filtering and energy storing circuit, for providing a line voltage by performing a filtering and energy storing operation on the input voltage;
    a switching power converter for converting the line voltage to an output current for an LED load under a control of a driving voltage; and
    a control unit for receiving and processing at least one feedback signal from the switching power converter to determine an on time per switching cycle and generating the driving voltage;
    wherein the control unit includes an on-time controller and a timer, the on-time controller being used for operating in a constant on-time mode to determine the on time according to the at least one feedback signal, and the timer being used for setting a maximum limit on the on time.

2. The dimmable LED driving circuit without phase angle measurement as claim 1, wherein the control unit further includes a driver for providing the driving voltage.

3. The dimmable LED driving circuit without phase angle measurement as claim 1, wherein the control unit further includes a feedback circuit for processing and using the at least one feedback signal to perform a pulse width modulation operation to generate a timing control signal and provide the timing control signal to the on-time controller.

4. The dimmable LED driving circuit without phase angle measurement as claim 1, wherein the phase-cutting operation is a leading edge phase-cutting operation or a trailing edge phase-cutting operation.

5. The dimmable LED driving circuit without phase angle measurement as claim 1, wherein the at least one feedback signal includes a voltage feedback signal and/or a current feedback signal.

6. The dimmable LED driving circuit without phase angle measurement as claim 1, wherein the on time is a function of the input voltage.

7. The dimmable LED driving circuit without phase angle measurement as claim 1, wherein the on time is a function of the at least one feedback signal.

* * * * *